May 19, 1942.  L. D. DANFORTH  2,283,850
TENSION LOCK NUT
Filed June 22, 1939
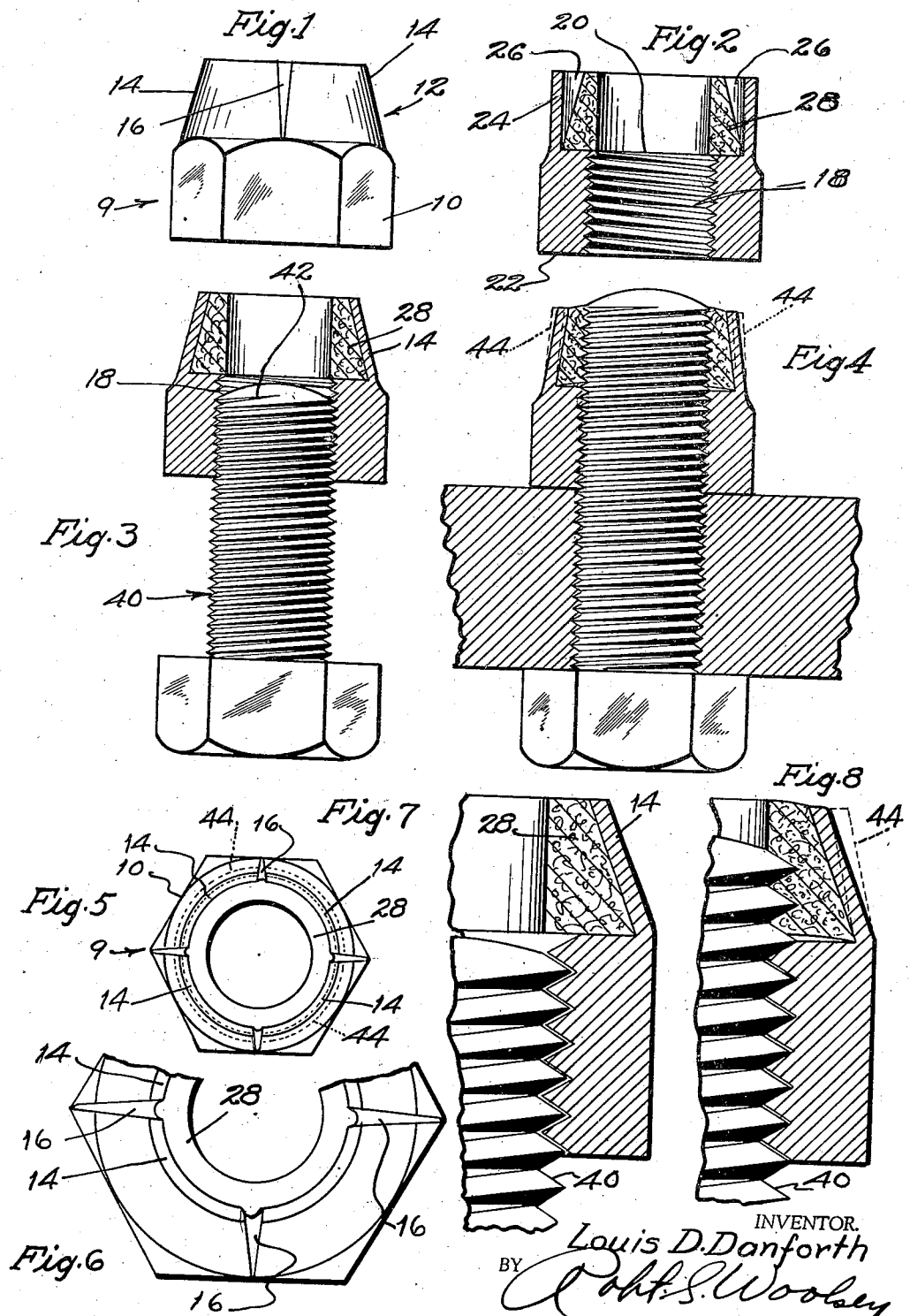
INVENTOR.
Louis D. Danforth
BY Robt. S. Woolsey
ATTORNEY.

Patented May 19, 1942

2,283,850

UNITED STATES PATENT OFFICE 2,283,850

TENSION LOCK NUT

Louis D. Danforth, Los Angeles, Calif.

Application June 22, 1939, Serial No. 280,597

4 Claims. (Cl. 151—7)

The device of this invention relates, as the title indicates, to nuts adapted to function in combination with bolts to hold work in place.

Ordinarily a nut is held upon its associated bolt by friction of the intermeshed threads, and when the nut is very tightly secured in place, by tension of the intermeshed threads of the bolt and its nut.

This construction and operation is quite conventional and for many purposes is quite satisfactory, however in many of the newer services and machine operations, vibration is so intense as to readily loosen nuts from bolts, and depending upon the service in which the nuts are employed, may cause great damage, inconvenience, and hazard.

The applicant is conversant with many practices adapted to effect greater rotational resistance between a nut and its associated bolt than is commonly acceptable, such as, threaded metallic inserts, thread distortion, etc., but, insofar as the applicant has knowledge, construction in a nut has never been employed which utilizes in combination therewith, a compressible and displaceable, non-threaded material which is adapted to threadedly receive a bolt, which when so received is under a constantly applied, resilient tension of the stock from which the nut is formed, whereby a measurable increase of pressure upon the threads of the bolt is created, thus increasing rotational resistance of the nut upon its bolt.

It is accordingly a prime object of the present invention to provide a lock-nut having a recessed, threaded, metallic section provided with segmented upper sides, and a non-threaded, deformable, and expandable portion seated in said recess and normally in abutment with the upper threaded end of said lock-nut, whereby upon threadedly engaging the whole of the nut upon a bolt, said bolt will cause the previously non-threaded portion to lift against and bear outwardly against the inherent tension of said segmented sides thereby placing an above normal pressure upon the matched and engaged faces of the lower sides of the threads of the bolt and the upper sides of the threads of the nut.

Another object of the invention is to provide a lock-nut of the character contemplated which may be repeatedly applied and removed without impairing the gripping qualities thereof.

A further object of the invention is to provide means in a nut of the character contemplated which are adapted to be resiliently outwardly and upwardly displaced whereby pressure is transmitted to one-half of the matched and engaged faces of a lock-nut and its associated bolt to increase rotational friction therebetween.

A still further object of the invention is to provide a lock-nut which is easily constructed, readily applied to work, and of relatively low cost, which affords increased tension upon the threads of the bolt to which it is applied.

Other objects, features, and advantages of the invention may be apparent from the accompanying drawing, the specification, and the subjoined claims.

In the drawing of which there is one sheet:

Figure 1 is a side elevation of the lock-nut of this invention.

Figure 2 is a transverse section taken through the nut before completion, showing the relative position of the several parts of the nut.

Figure 3 is a side elevation of a bolt showing its lock-nut in transverse section, the bolt being shown threaded through the steel portion thereof just prior to cutting its way into the deformable and expandable insert in the nut.

Figure 4 is a view substantially the same as Figure 3, except that here the bolt has cut its way through the insert and the segmented upper extremities of the sides of the nut are shown in expanded position, the degree of expansion being exaggerated for the sake of clarity of illustration.

Figure 5 is a plan view of the lock-nut of this invention.

Figure 6 is a fragment of the lock-nut showing in exaggerated detail how the insert is pressed into the slotted openings between the segmented upper side-walls of the lock-nut, thereby creating a firm grip upon the insert which prevents any tendency of the insert to rotate when a bolt is cutting threads therein.

Figure 7 is detail of a fragment of the lock-nut showing the normal relation between the threads of a nut and a bolt.

Figure 8 shows how pressure is applied by the lower sides of the bolt thread upon the upper face of a nut thread after the threads of a bolt cut their way into the insert, this illustration clearly shows the manner in which increased pressure is placed upon the threads of the bolt and nut.

Referring now to the drawing, it will be noted that the lock-nut of this invention comprises a body portion 10 of hexagonal or other conventional form, and that in the finished form, as shown in Figures 1, 3, 4, and 5, the upper portion of the lock-nut is substantially shaped in the manner of a frustum of a cone. That is, the upper sides are inclined inwardly toward the medial vertical axis of the lock-nut, while the top thereof is foreshortened in a plane which is parallel with the base of the lock-nut.

The tapered sides 12 of the lock-nut are divided into segments 14 by intervening slots 16 which extend downwardly from the top edge of the nut to a point adjacent an imaginary line which separates the conical portion of the nut from its hexagonal or other shaped lower body portion.

As shown in the drawing, the threads 18 of the lock-nut extend only partially through the depth of the nut, terminating in an annular recess, the base 20 of which is parallel with the base 22 of the nut, and during construction of the nut, the sides 24 of the recess 26, are cylindrical in shape to receive an insert 28 which is also shaped as a frustum of a cone, as shown in section in Figure 2.

After placing the insert 28 in the body of the nut, a forming tool is utilized to bend the segmented sides 14 into firm contact with the exterior walls of the insert, thereby imprisoning the same within the nut as shown in the drawing.

The degree of inclination given the sides of the slots 16 is naturally considerably greater when initially formed than when in finished and assembled condition, due to the fact that when the forming tool (not shown) bends the segmented sides in converging direction, it is not desirable that too large a gap exist between the segments 14 of the nut. In practice it has been found that, considering a standard ⅜ inch nut as an example, the top span of the slots 16 would not need to exceed 1/32 of an inch, the lower end of the slot terminating of course into a vanishing point of any practical minimum width.

The functional operation of the lock-nut of this invention may be described as follows.

The lock-nut 9 may be threadedly screwed upon a bolt 40 in the customary manner as shown in Figure 3, until the upper end thereof intersects the unthreaded insert 28, thereafter continued rotation of the nut will cause the threads 42 of the bolt to cut their course through the insert as shown in Figures 4 and 8 until the bolt has threadedly penetrated the insert, which is of course formed of a deformable and expandible material such as fiber.

Incursion of the threads 42 into the material of the insert, not only deforms the same, but also as a consequence thereof causes an outward and upward displacement in the insert, which movement carries the insert off of its seat and causes the same to press against the segmented conical walls of the nut, thereby bending them outwardly as indicated in dotted lines 44, although the degree of flexure indicated is disproportionately great, being thus shown for the sake of clarity of illustration.

Outward displacement of the segmented sides 14 is obtained against the inherent tension of the steel stock of which the body of the nut is formed. This action quite obviously, constantly presses inwardly and downwardly upon the insert 28 thereby forcing the whole of the bolt downwardly upon the nut threadedly engaged thereon, and results in greatly increasing the friction between the lower face of the threads of the bolt and the upper face of the threads of the nut, and as a consequence thereof reducing to a negligible figure the likelihood of the lock-nut becoming loose upon the bolt.

Due to the fact that the segmented sides 14 are under an inherent tension due to the resiliency of the metal of the nut, it is found that upon disengaging the nut from the bolt that the segmented sides again force the insert 28 to its seat or base 20, thereby permitting their return in a substantial degree to their point of non-flexure or beginning. Clearly this action which does not mutilate any part of the nut, renders the same fit for subsequent use with very slight loss of initial efficiency in thread grip.

It is also to be noted that as the insert is pressed outwardly against the segmented walls, the insert bulges outwardly into the slots 16. This action while relatively slight is nevertheless an accomplished fact, and as a consequence thereof the insert is fixedly secured within the recess of the lock-nut preventing any possible axial rotation thereof, so that when the nut is run upon the bolt the threads thereof are cleanly cut or turned through the insert instead of otherwise possibly churning their way through the insert and consequently rupturing the thread formation thereof.

Thus it will be clearly apparent that by providing a lock-nut having a deformable non-threaded insert confined and held in axial alignment with a threaded steel nut by the inclined overhanging segmental walls of the nut which may and will resistingly flex or bend under pressure, that I have provided a constantly applicable source of thread pressure upon the intermeshed threads of a nut and a bolt. It will also appear from the foregoing that since the segmented walls of the nut resist upward displacement of the insert, that an equal and opposite reaction or thrust is placed upon the bolt 40, thereby forcing the same downwardly with respect to the nut, and as a consequence thereof such clearance as there may be between the threads of the bolt and nut is reduced to zero, bringing the threads of the bolt and nut into positive pressure contact in such manner that the lower face of each of the engaged threads of the bolt is brought into contact with the upper face of the engaged threads of the nut in a degree which is far in excess of normal, thereby greatly increasing the friction between the thread surfaces and concurrently increasing rotational resistance between the nut and bolt, and likewise minimizing axial clearance between the nut and bolt by reason of such increased thread pressure.

It is possible that various changes and modifications and variations may be made in practicing the invention in departure from the particular showing of the drawing and description as given, without however, departing from the true spirit of the invention as defined by the scope of the appended claims, and accordingly the present illustration is to be considered my present preferred form of the invention, and the claims are to be considered the measure of the true scope thereof.

I claim:

1. A lock-nut comprising a threaded metallic body portion and an annular, deformable, and non-threaded insert in said body portion in medial axial alignment therewith, said metallic body portion being formed with outwardly individually yieldable segmented wall portions convergingly inclined with respect to one another whereby said insert is retained in said body portion under resistance to flexure of said segmented walls by an extraneous body.

2. In a lock-nut having a threaded metallic body portion, a frusto-conical recess in said body portion, a non-threaded hollow and deformable insert shaped to fit within said recess, the walls of said recess being slotted whereby segmented divisions thereof are free to dilate under application and removal of a displacing pressure applied to said insert when a bolt is threaded thereinto.

3. A lock-nut comprising a threaded metallic body portion, an annular deformable insert engaging the top of the body portion and having a tapered exterior, and a plurality of individually flexible wall portions formed integral with the top of the body and deflected inwardly into conformity with the insert to hold the insert under combined radial and axial pressure and against rotation relative to the body.

4. In a nut of the character described, a threaded body, a plurality of thin finger-like segmented extensions integral with the top of the body and forming a chamber at the top of the body, an annular conformable frusto-conical insert in said chamber, the said extensions being disposed to substantially conform to the exterior of the filler to grip the filler and hold it against turning relative to the body and in position at the top of the body to yieldingly grip a bolt passed through the body.

LOUIS D. DANFORTH.